Patented Aug. 13, 1940

2,211,070

UNITED STATES PATENT OFFICE 2,211,070

MANUFACTURE OF PHENOL-KETONE CONDENSATION PRODUCTS

William Henry Moss, London, England, assignor to Celanese Corporation of America, a corporation of Delaware No Drawing. Application December 15, 1936, Serial No. 115,983. In Great Britain January 2, 1936

6 Claims. (Cl. 260—50)

This invention relates to the manufacture of phenol-ketone condensation products and of resins therefrom.

When two molecular proportions of a monohydric phenol are condensed with one molecular proportion of a ketone, it is sometimes possible by a careful control of the reaction conditions to obtain a crystalline product. Usually, however, the product is resinous, and valuable synthetic resins have been produced in this way. For example by the condensation of phenol or o-cresol with acetone, more or less resinous materials are produced which are compatible with cellulose acetate. Such materials are commonly referred to as phenol-ketone condensation products. A further series of resins is produced when these condensation products are themselves caused to react with aldehydes or ketones, for example with formaldehyde, in an acid, alkaline or neutral medium.

According to the invention phenol-ketone condensation products are subjected to recrystallisation, using as solvent a chlorinated aliphatic hydrocarbon or a mixture comprising two or more chlorinated aliphatic hydrocarbons. Preferably the products are recrystallised from carbon tetrachloride or hexachlorethane. It has been found that recrystallisation from chlorinated aliphatic hydrocarbons gives much better and more satisfactory results than does recrystallisation from unsubstituted hydrocarbons such as benzene or its homologues. By recrystallising from chlorinated aliphatic hydrocarbons it is possible to obtain a comparatively high proportion of the condensation product in a crystalline form, leaving a resinous residue which is similar to but not identical with the untreated phenol-ketone condensation product.

The invention is of particular value when applied to the treatment of products obtained by condensing a ketone with o-cresol. Such products may for instance be produced by condensing o-cresol with acetone or with a substituted acetone, for example in the presence of an acid catalyst, e. g. hydrochloric acid or phosphoric acid. When the simplest di-o-cresol-acetone product — di-(4-hydroxy-3-methyl-phenyl) dimethyl methane, hereinafter referred to briefly as dicresylol propane—is dissolved in hot carbon tetrachloride and the solution allowed to cool, up to 50% of the weight of the untreated product is recovered in a crystalline form. A further recrystallisation yields a product melting at 137—138° C., which is probably pure crystalline dicresylol propane.

The uncrystallised or resinous residue closely resembles the untreated product: for example both the untreated dicresylol propane and the residue remaining after recrystallisation are compatible with cellulose acetate to a very substantial degree. The resinous residue is, however, substantially harder than the untreated product and in association with cellulose acetate possesses a greater fastness to light. Like the untreated product, the resinous residue may be combined with formaldehyde or other aldehydes or ketones to produce diphenylol propane-aldehyde or diphenylol propane-ketone resins respectively.

The recrystallised material may very usefully be employed as a plasticiser for organic derivatives of cellulose, and especially for cellulose acetate. For example it may be employed in amount about 10, 20, or up to 50 or 100% on the cellulose acetate. Another important use is in the production of diphenylol propane-formaldehyde and other diphenylol propane-aldehyde and -ketone resins. For instance recrystallised dicresylol propane may be condensed with formaldehyde in an acid, alkaline or neutral medium. The precise properties of the new resins so produced and the degree of resinification depend partly on the reaction conditions. For example, if recrystallised dicresylol propane is refluxed with aqueous formaldehyde in the presence of an acid catalyst, for instance phosphoric acid, for some hours, a light coloured resin of relatively low melting point is obtained. Generally speaking, it is preferred to employ an acid catalyst on account of the high compatibility with cellulose acetate of the resins so produced.

The new diphenylol propane-aldehyde resins, and especially the dicresylol propane-formaldehyde resin described in the last paragraph, combine compatibility for cellulose acetate, especially when prepared in an acid medium, with a high degree of light fastness. In this respect and from other points of view they are considerably more valuable than are the diphenylol propane-aldehyde resins previously known.

The invention may also be applied with advantage to the manufacture of halogenated phenol-ketone products and of halogenated diphenylol propane-aldehyde and -ketone resins, starting from halogenated phenols. For example chlorine-substituted phenol or cresols may be condensed with acetone or other suitable ketone and the product recrystallised and condensed with formaldehyde or other aldehyde or ketone. The uncrystallised residue may also, if desired, be condensed with an aldehyde.

The new diphenylol propane-aldehyde and -ketone resins and halogenated diphenylol propane-aldehyde and -ketone resins are of particular value in the manufacture of varnishes owing to their miscibility with oils, and especially with oils of the linseed oil and castor oil groups. They may also be used with advantage in the manufacture of moulded articles, e. g. gramophone records, as bonding or impregnating agents, as primers in cellulose derivative lacquers, and for other purposes for which resins are employed. In general they may be employed for the purposes and in the ways described in United States Patent No. 2,050,366.

The following examples illustrate the invention without in any way limiting it.

*Example 1*

100 parts by weight of o-cresol, 54 parts of acetone, and 12 parts of concentrated hydrochloric acid are heated under reflux to 100° C. for about 20 hours. The products consist of a resinous material, a small aqueous layer, and a dark heavy oil from which unreacted o-cresol can be isolated for re-use. The resinous material is twice recrystallised from about 8 times its weight of carbon tetrachloride, giving crystalline dicresylol propane, which is found to have valuable plasticising properties for cellulose acetate. From the mother liquor is obtained a resinous material similar to but harder than the resin before recrystallisation.

*Example 2*

400 parts by weight of the crystalline dicresylol propane obtained according to Example 1 are heated under reflux with 450 parts of 40% formaldehyde solution and 4 parts of phosphoric acid. After 8 hours the heating is discontinued, and the resinous material resulting is washed in hot water and then fused to remove residual water. The resin so obtained is compatible with cellulose acetate. By increasing the time of heating, a resin of higher melting point can be obtained.

Having described my invention what I desire to secure by Letters Patent is:

1. In a process for the preparation of both a crystalline and a hard resinous phenol-ketone condensation product, the steps of forming a resinous product of reaction of a phenol and a ketone in presence of an acid catalyst, dissolving the initial resinous product in a fully chlorinated aliphatic hydrocarbon, allowing as much of the product as will to crystallize therefrom, separating the mother liquor from the crystals and recovering from the separated mother liquor a hard resinous product which is harder than the initial resinous product.

2. In a process for the preparation of both a crystalline and a hard resinous phenol-ketone condensation product, the steps of forming a resinous product of reaction of a phenol and a ketone in presence of an acid catalyst, dissolving the initial resinous product in carbon tetrachloride, allowing as much of the product as will to crystallize therefrom, separating the mother liquor from the crystals and recovering from the separated mother liquor a hard resinous product which is harder than the initial resinous product.

3. In a process for the preparation of both a crystalline and a resinous dicresylol propane compound, the steps of condensing o-cresol with acetone in presence of an acid catalyst under conditions such that a resinous product is obtained, dissolving this resinous product in a fully chlorinated aliphatic hydrocarbon, allowing as much of the product as will to crystallize therefrom, separating the mother liquor from the crystals and recovering from the separated mother liquor a hard resinous product which is harder than the initial resinous product.

4. In a process for the preparation of both a crystalline and a resinous dicresylol propane compound, the steps of condensing o-cresol with acetone in presence of an acid catalyst under conditions such that a resinous product is obtained, dissolving this resinous product in carbon tetrachloride, allowing as much of the product as will to crystallize therefrom, separating the mother liquor from the crystals and recovering from the separated mother liquor a hard resinous product which is harder than the initial resinous product.

5. In a process for the preparation of both a crystalline and a resinous chlorinated phenol-ketone condensation product, the steps of condensing a chlorinated phenol with a ketone in presence of an acid catalyst under conditions such that a resinous product is obtained, dissolving this resinous product in a fully chlorinated aliphatic hydrocarbon, allowing as much of the product as will to crystallize therefrom, separating the mother liquor from the crystals and recovering from the separated mother liquor a hard resinous product which is harder than the initial resinous product.

6. In a process for the preparation of both a crystalline and a resinous chlorinated phenol-ketone condensation product, the steps of condensing a chlorinated phenol with a ketone in presence of an acid catalyst under conditions such that a resinous product is obtained, dissolving this resinous product in carbon tetrachloride, allowing as much of the product as will to crystallize therefrom, separating the mother liquor from the crystals and recovering from the separated mother liquor a hard resinous product which is harder than the initial resinous product.

WILLIAM HENRY MOSS.